United States Patent [19]
Hirmer et al.

[11] Patent Number: 6,090,336
[45] Date of Patent: *Jul. 18, 2000

[54] METHOD FOR MANUFACTURING AN INJECTION-MOLDED ARTICLE WITH OUTER FILM SECURED THERETO

[75] Inventors: Gerhard Hirmer, Aurora; Rudolph Allan Schrempf, Caledon East, both of Canada

[73] Assignee: Decoma International Inc., Canada

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/278,336

[22] Filed: Jul. 21, 1994

[51] Int. Cl.⁷ .................................................. B29C 45/16
[52] U.S. Cl. .......................... 264/511; 264/513; 264/266; 264/259; 264/DIG. 78; 425/DIG. 60; 425/DIG. 48
[58] Field of Search ...................... 264/511, 513, 264/266, 259, DIG. 78; 425/DIG. 60, DIG. 48

[56] References Cited

U.S. PATENT DOCUMENTS

| | | |
|---|---|---|
| 2,724,877 | 11/1955 | Ramsay . |
| 2,968,064 | 1/1961 | Howell ............................ 425/DIG. 48 |
| 2,991,600 | 7/1961 | Lancaster ........................ 425/DIG. 48 |
| 3,147,176 | 9/1964 | Haslam . |
| 3,606,433 | 9/1971 | Kunevicius . |
| 3,687,502 | 8/1972 | Loew . |
| 3,770,545 | 11/1973 | Jackson . |
| 3,780,152 | 12/1973 | Friesner . |
| 3,934,385 | 1/1976 | Paulus et al. . |
| 4,052,497 | 10/1977 | Monnet . |
| 4,174,988 | 11/1979 | Moore et al. . |
| 4,308,302 | 12/1981 | Etter et al. . |
| 4,318,764 | 3/1982 | VanManen . |
| 4,328,273 | 5/1982 | Yackiw . |

(List continued on next page.)

FOREIGN PATENT DOCUMENTS

| | | |
|---|---|---|
| 0186015 | 7/1986 | European Pat. Off. . |
| 0419001 | 3/1991 | European Pat. Off. . |
| 0531977 | 3/1993 | European Pat. Off. . |
| 0623448 | 11/1994 | European Pat. Off. . |
| 2525143 | 10/1983 | France . |
| 2341060 | 2/1975 | Germany . |
| 4033297 | 5/1991 | Germany . |
| 0029422 | 2/1982 | Japan ..................................... 264/511 |

OTHER PUBLICATIONS

Patent Abstract of Japan, vol. 8 No. 280 (M–347) [1717], Dec. 21, 1984, & JP, A, 59–150741 (Sumitomo Kagaku Kogyo), Aug. 29, 1984.

Patent Abstract of Japan, vol. 12 No. 424 (M–761), Nov. 10, 1988 & JP, A, 63–159022 (Sumitomo Chem Co Ltd), Jul. 1, 1988.

Plastverarbeiter, vol. 44, No. 4, Apr. 1993 Speyer/Rhein DE, pp. 62–64,66,68, XP 000393013, Michaeli 'Hinterspriztechnik, Teil 2: Eine Analyse der Randbedingungen'.

*Primary Examiner*—Jan H. Silbaugh
*Assistant Examiner*—Robin S. Gray
*Attorney, Agent, or Firm*—Fitzpatrick, Cella, Harper & Scinto

[57] ABSTRACT

A method and apparatus for manufacturing an injection-molded article having an outer film on an exposed surface. The method includes securing the film about its periphery within a mold cavity prior to injection of molten material into the cavity. One way of securing the film is by applying vacuum pressure through peripheral holes in a frame surrounding the mold cavity. Molten material is injected into the cavity, behind the film and the film slips from its initial position to be forced against a wall of the cavity by molten material being injected into the cavity. The apparatus includes a frame for a molding apparatus, adapted to initially secure the film in place prior to movement of the core block into place and to permit the film to slip from its initial position to be forced against the cavity wall as molten material fills the cavity.

8 Claims, 6 Drawing Sheets

U.S. PATENT DOCUMENTS

| | | |
|---|---|---|
| 4,352,772 | 10/1982 | Bezner . |
| 4,358,482 | 11/1982 | Jubelt . |
| 4,619,847 | 10/1986 | Jackson . |
| 4,778,550 | 10/1988 | Barton et al. . |
| 4,793,793 | 12/1988 | Swenson et al. ......................... 264/511 |
| 4,797,244 | 1/1989 | Saver ....................................... 264/266 |
| 4,873,041 | 10/1989 | Masui et al. ............................ 264/135 |
| 4,965,103 | 10/1990 | Roberts et al. . |
| 4,968,474 | 11/1990 | Ito ............................................ 264/513 |
| 5,085,902 | 2/1992 | Yada et al. . |
| 5,123,988 | 6/1992 | Iwasa . |
| 5,143,772 | 9/1992 | Iwasa . |
| 5,178,708 | 1/1993 | Hara et al. .............................. 264/259 |
| 5,207,027 | 5/1993 | Larsen . |
| 5,223,201 | 6/1993 | Masui et al. ............................ 264/163 |
| 5,238,640 | 8/1993 | Masui et al. ............................ 264/266 |
| 5,240,751 | 8/1993 | Cakmakci . |
| 5,277,950 | 1/1994 | Zollar . |
| 5,281,383 | 1/1994 | Veki et al. .............................. 264/259 |
| 5,326,523 | 7/1994 | Güstävel et al. . |
| 5,352,397 | 10/1994 | Hara et al. .............................. 264/153 |
| 5,401,457 | 3/1995 | Valyi ....................................... 264/266 |
| 5,415,536 | 5/1995 | Ohno ....................................... 264/511 |

METHOD FOR MANUFACTURING AN INJECTION-MOLDED ARTICLE WITH OUTER FILM SECURED THERETO

FIELD OF THE INVENTION

This invention relates to a method and apparatus for manfacturing an injection-molded article having an outer film. The invention includes securing the film about its periphery within a mold cavity prior to injection of molten material. The apparatus is adapted to permit the film to slip from its initial position to be forced against the cavity wall as molten material fills the cavity. In the disclosed embodiment, film edges are initially secured in place by a vacuum applied through perimeter holes of the cavity wall.

BACKGROUND OF THE INVENTION

Known in the automotive industry, for example, are trim pieces manufactured by a process of injection molding of polymeric materials such as thermoplastics such as polyvinyl chloride (PVC), or thermosetting materials such as the terpolymer of ethylene propylene diene monomer (EPDM), etc.

Such a trim piece is known to be provided with an outer laminar film or skin for decorative and/or protective purposes. Such films are typically of polyvinyl chloride or a fluorinated polyolefin, and may be multi-layered.

A typical method of manufacturing such a trim piece involves injecting molten PVC into a cavity mold behind a film held in a mold cavity about its edges. The film is forced by the molten material into abutment with the face of the mold cavity to take on the three-dimensional pattern of the face of the mold. Because the film is secured within the mold about its edges, the filmn stretches unevenly during formation of the piece. Such stretching often leads to an aesthetically undesirable appearance of the final product. Further, it is generally not practicable to wrap the film edge behind onto the rear face of the injection-molded portion of the piece using this approach.

Another method of manufacturing a trim piece involves injecting molten material into a cavity behind a pre-formed rigid or semi-rigid film located in the cavity. This approach thus requires the film to be shaped in a separate step, as for example, by vacuum forming prior to the injection molding step and the film to be rather carefully located in the mold cavity for proper formation of the piece. The film portion must also be trimmed at some point.

It is generally desirable for the film of such pieces to wrap behind onto the rear surface of the injection-molded substrate of the piece. In the context of this invention, we refer to a trim piece in which at least edges of the film are wrapped onto the rear surface of the substrate as an "edge-wrapped" piece. Such edge-wrapped pieces can be desirable, for example, because once such a piece is installed on an automobile and the rear surface is concealed, lack of access to the edge of the film lessens the likelihood of film delamination.

Aesthetically, edge-wrapped pieces can be desirable as the underlying substrate is unexposed. The underlying injection-molded portion might have a less pleasing appearance than the film. This would be the case, for instance, where the substrate is of low-grade injection-molded PVC and the film is a high-quality laminate. Further, in the industry today, it is desirable to use recycled material wherever possible. An unexposed underlying substrate presents such an opportunity.

SUMMARY OF THE INVENTION

It is thus an object of the present invention to provide an improved manufacturing process of such trim pieces and an apparatus for carrying out the improved process.

In one aspect, the present invention is a process for manufacturing an article having an outer film secured to an injection-molded substrate. The process includes securing a film about edges thereof within a cavity of an injection-molding apparatus and injecting molten material into the cavity so as to force the film into abutment with a wall of the cavity. The process includes releasing at least a first of the secured edges of the film to permit movement of the film into abutment with the cavity wall as the material fills the cavity.

According to the process the film can be secured by vacuum pressure applied through apertures in a wall of the cavity.

In a particular embodiment process, described further below, the process is used for manufacturing an automotive trim piece. In the disclosed process, the cavity is longitudinally shaped for manufacturing a longitudinal automotive trim piece having a longitudinal axis, the molten material is injected at a longitudinally intermediate location of the cavity, and the vacuum pressure applied to the film edges is released from a longitudinally intermediate location to first and second axial ends of the cavity as the molten material moves from the intermediate toward the axial end locations of the cavity.

The secured edges can be released by reduction in the vacuum pressure applied to the film as the molten material is injected into the cavity.

The film can be oversized with respect to the obverse surface area of the article to which it is to be secured.

The process can include wrapping film around edges of the article onto a reverse area of the article as the molten material is injected into the cavity.

The process can further include the step of thinning a region of the film for removal of excess film from the rear face of the article.

In another broad aspect, the process is for manufacturing an injection-molded article having a film secured to a front face thereof, including securing a film about edges thereof within a cavity of an injection-molding apparatus, injecting molten material into the cavity so as to force the film into abutment with a wall of the cavity. The film is releasably secured about the edges to permit movement of the film into abutment with the wall of the cavity as the material fills the cavity such that the film attains a threedimensional impression complementary to that of the wall.

The apertures can be located in a frame positioned intermediate a cavity block and a core block of an injection-molding apparatus.

Process conditions can be arranged such that the suction is sufficient to secure the film in place with respect to the frame prior to the injecting step while permitting the film to slip with respect to the frame into abutment with the cavity wall during the injecting step.

The film can be oversized with respect to the front face of the article and the process can include positioning a sheet of the film such that there is gap between the obverse face of the film and the wall of the cavity prior to the injecting step.

It is often desirable that the molten material and film be compatible with each other to avoid the use of adhesive for bonding of the substrate and film to each other._

The film can thus include a tie-layer selected from the group of thermoplastic olefins, thermoplastic polyurethane, acrylonitrile butadiene styrene, styrene acrylonitrile, and polycarbonate and the molten material can be selected to be compatible with the tie-layer.

The apertured frame can be positioned intermediate a cavity block and a core block of an injection-molding apparatus and a portion of the frame can define a perimetral portion of the cavity wall with a gap between the core block and the frame for location of the film between the core block and frame. An opening of the gap can thus be in communication with the cavity and be located such that a portion of the film is forced into abutment with the portion of the frame such that a portion of the film is wrapped onto a rear face of the article.

The process can include the step of removing excess film from the article. The frame can further include a pointed tip surrounding the cavity such that the film is thinned by contact therewith during the injection step to enhance the removal of the excess film.

In another broad aspect, the invention is a process for manufacturing an injection-molded article having a film secured to a front face of an injection molded substrate. The process includes positioning a sheet of film within a cavity of an injection-molding apparatus and applying vacuum pressure through apertures in a wall of the cavity to a perimetral area of an obverse face of the film to hold the film in position and injecting molten material into a region of the cavity behind the film so as to force the obverse face of the film into abutment with a wall of the cavity such that the film attains a three-dimensional impression complementary to that of the wall. The vacuum pressure is controlled to permit movement of the film into abutment with the cavity wall so as to preclude undue stretching of the film as the material fills the cavity.

In another aspect, the process is for manufacturing an injection-molded article having a film secured to a front face. The process includes securing a film about edges thereof within a cavity of an injection-molding apparatus and injecting molten material into the cavity so as to force the film into abutment with a wall of the cavity. The film is secured about the edges to permit movement of at least one edge of the film into abutment with the wall of the cavity as the material fills the cavity such that the film attains a three-dimensional impression complementary to that of the wall.

In another aspect, the invention is an injection-molding apparatus for manufacturing an article having an outer film. The apparatus includes a cavity block and a core block, a mold cavity being defined between adjacent surfaces of the blocks when the blocks are juxtaposed for manufacture of an injection-molded article. There is a frame locatable between the juxtaposed blocks around the perimeter of the mold cavity. There is means for securing a perimeter of a film piece to the frame prior to injection of molten material into the cavity to permit, as the molten material is injected into the mold cavity to force the piece against a cavity block wall of the cavity, movement of the film perimeter with respect to the frame.

The securing means can include spaced apertures in the frame for applying vacuum pressure to the film piece.

There can be a gap between the core block and the frame for the film, the gap having an opening disposed inwardly of a surrounding outer wall of the cavity surface of the cavity block. The frame can include a surface opposing the cavity block wall of the mold cavity to define a cleft between the frame and cavity block for acceptance of the molten material and the film piece therein such that, as the molten material is injected into the cavity, a portion of the article is formed in the cleft with film on obverse and reverse faces of the article.

The opposing surface can be located to surround a periphery of the mold cavity such that the article is formed with film completely covering its obverse, i.e., exposed face, and a surrounding peripheral portion of the reverse face.

The frame of the apparatus can include a tip located inwardly of the opposing surface to define an edge for cutting waste film from a reverse side of the formed article.

In another broad aspect the invention is an injection-molding apparatus for manufacturing an automotive trim piece having an outer film on an obverse face thereof and a surrounding edge on reverse face thereof. The apparatus includes a cavity block and a core block, there being a mold cavity having a longitudinal axis being defined between adjacent surfaces of the blocks when the blocks are juxtaposed for manufacture of the piece therein. There is a frame located between the juxtaposed blocks around the perimeter of the mold cavity and having a plurality of spaced apertures therein connected to a vacuum for securing a film piece to the frame prior to injection of molten material into the cavity to permit, as the molten material is injected into the mold cavity to force the piece against a cavity block wall of the cavity, movement of the film perimeter with respect to the frame.

In yet another aspect, the invention is an injection-molding apparatus for manufacturing an article having an outer film on an outer exposed face. There is a cavity block and a core block, a mold cavity being defined between adjacent surfaces of the blocks, and a wall of the cavity block for defining the shape of the outer face of the article. A plurality of spaced apertures are defined in a surrounding wall of the cavity, for connection to a vacuum, for securing a perimeter of a film piece prior to injection of molten material into the cavity to permit, as the molten material is injected into the mold cavity to force the piece into position against the wall of the cavity block, movement of the film piece so as to avoid undue stretching the film.

In another broad aspect, the invention is a frame for use as part of an injection-molding apparatus having a mold cavity. The frame includes means for locating the frame around a perimeter of a mold cavity of the apparatus and means for securing a perimeter of a film piece to the frame prior to injection of molten material into the cavity to permit, as the molten material is injected into the mold to force the piece against a wall of the cavity, movement of the film perimeter with respect to the frame.

The securing means of the frame can include spaced apertures in the frame for application of vacuum pressure therethrough when an obverse face the film piece is located against the frame such that the molten material can be injected into a region of the cavity behind the film piece to force the obverse face of the piece into abutting position against a wall of the cavity such that the film attains a three-dimensional impression complementary to that of the wall.

The invention is also an injection-molding apparatus having a cavity block and a core block, there being a mold cavity being defined between adjacent surfaces of the blocks when the blocks are juxtaposed, a frame locatable between the juxtaposed blocks around the perimeter of the mold, there being means for securing a perimeter of a front surface of a film piece to the frame prior to injection of molten material into the cavity to permit, as the molten material is injected into the mold behind the piece to force the front surface of the piece against a wall of the mold cavity, movement of the film perimeter with respect to the frame.

BRIEF DESCRIPTION OF THE DRAWINGS

Preferred embodiments of the invention are described below, reference being add to the drawings, in which.

DETAILED DESCRIPTION OF PREFERRED EMBODIMENTS

Figure 1:
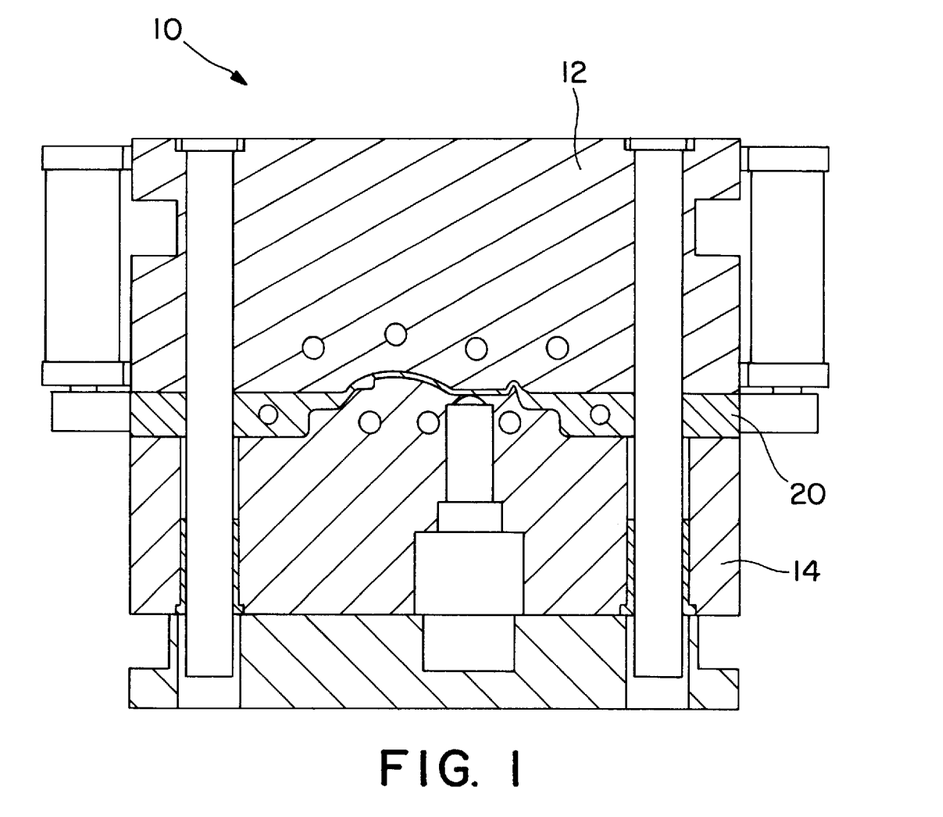
FIG. 1 is a side-sectional view of an assembled molding apparatus, the longitudinal mold cavity being transversely sectioned.

Turning to the drawings, a sectional view of a molding apparatus 10 is shown in FIG. 1. Apparatus 10 includes cavity block 12, and core block 14. Cavity 16 defined between the blocks is shaped to form the decorative portion 18 of an automotive trim piece. The illustrated trim part is of the sort which could be mounted on the outside of a vehicle door, for example. The illustrated trim part includes all visible portions of the final piece including the longitudinal and sidewise edges. The cavity is thus longitudinal, and is shown in transverse section in FIG. 1.

Intermediate cavity block 12 and core block 14 is what is termed in this specification "slip frame" 20. Slip frame 20 of the disclosed embodiment surrounds the mold cavity and defines a small perimetral portion 22 thereof, as can be most easily seen in FIGS. 4 to 8. The disclosed slip frame includes vacuum holes 24, the operation of which will be described in greater detail below.

Gap 26 between slip frame 20 and the perimeter of core block 14 accommodates stock film 28.

Figure 2:
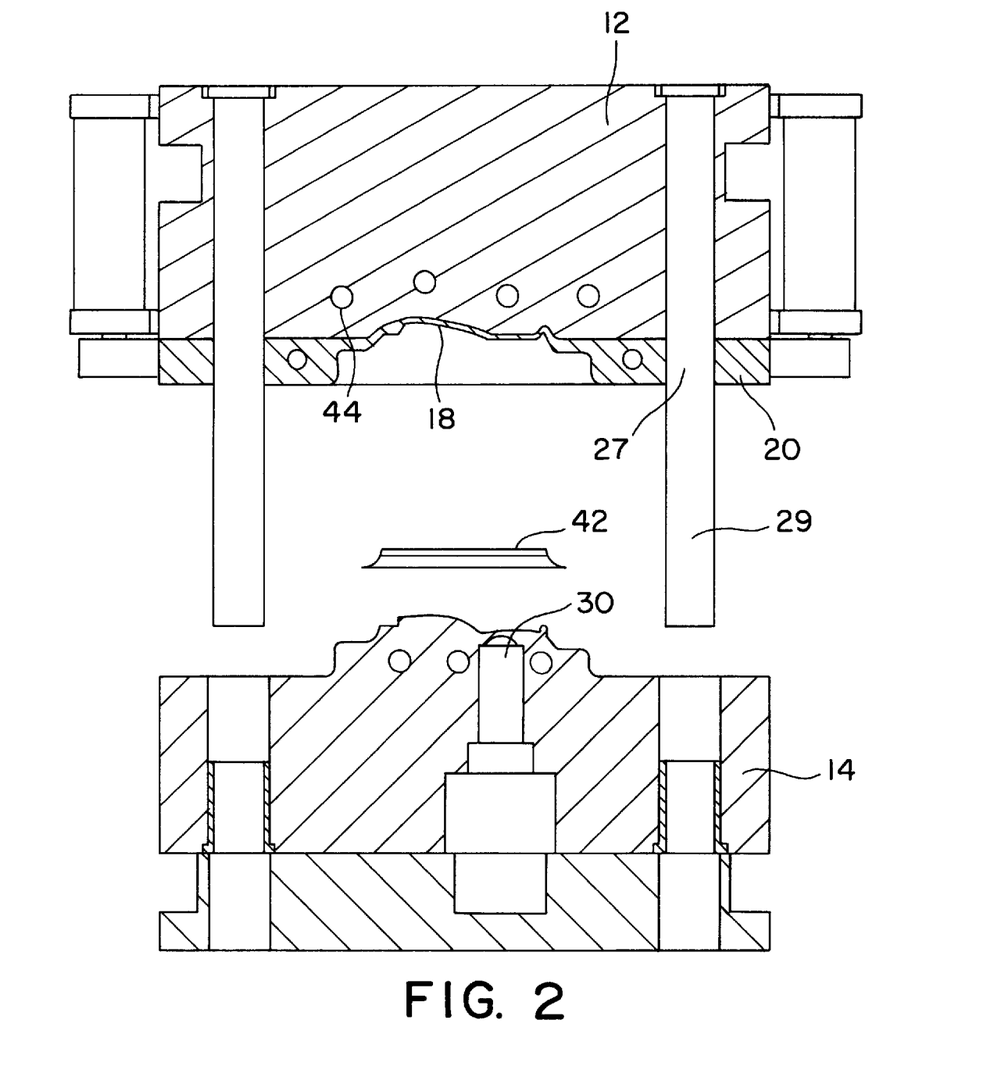
FIG. 2 is a partially exploded view similar to that of FIG. 1, the core block of the apparatus being spaced from the cavity block.
Figure 3:
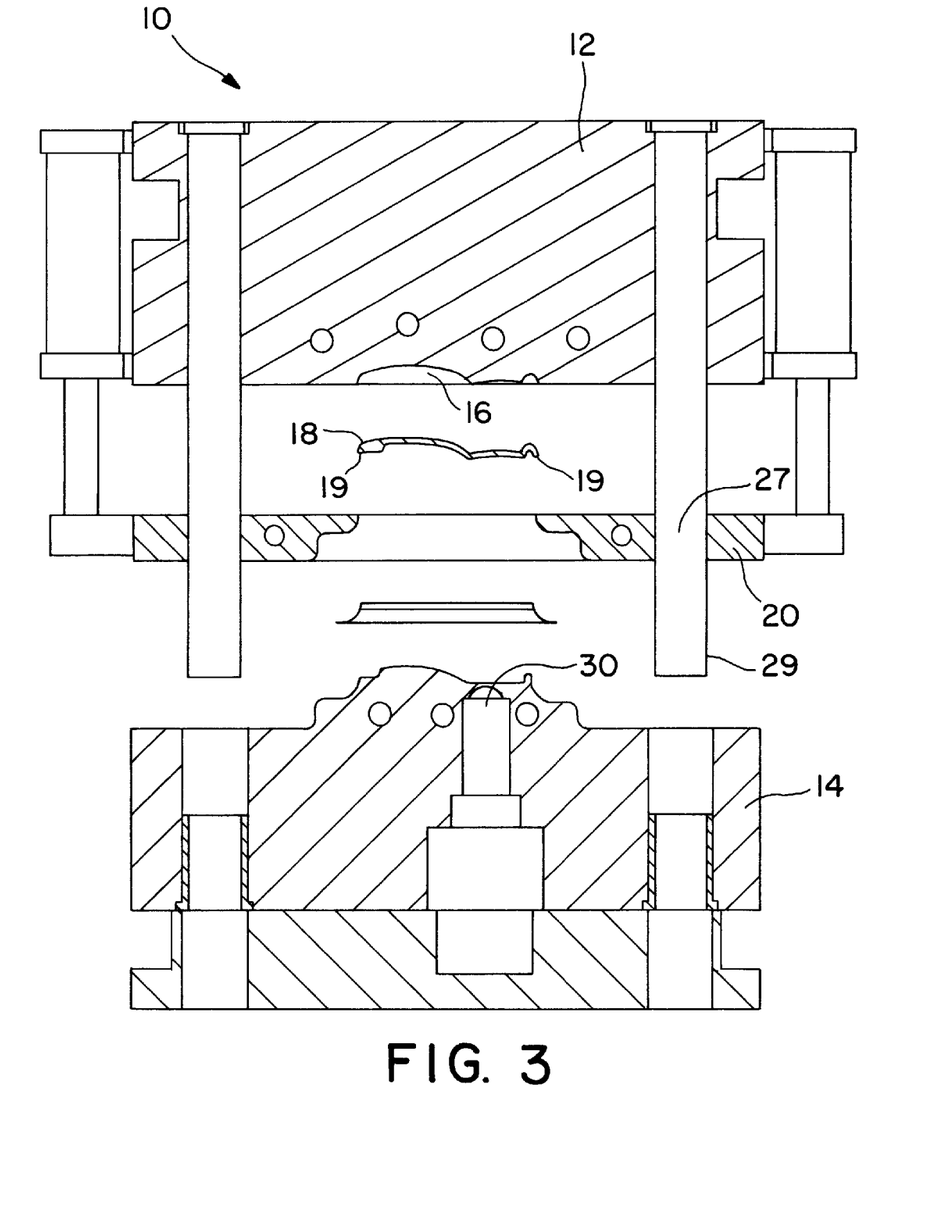
FIG. 3 is an exploded view similar to that of FIG. 1, the "slip frame" of the apparatus being spaced from the cavity block.
Figure 4:
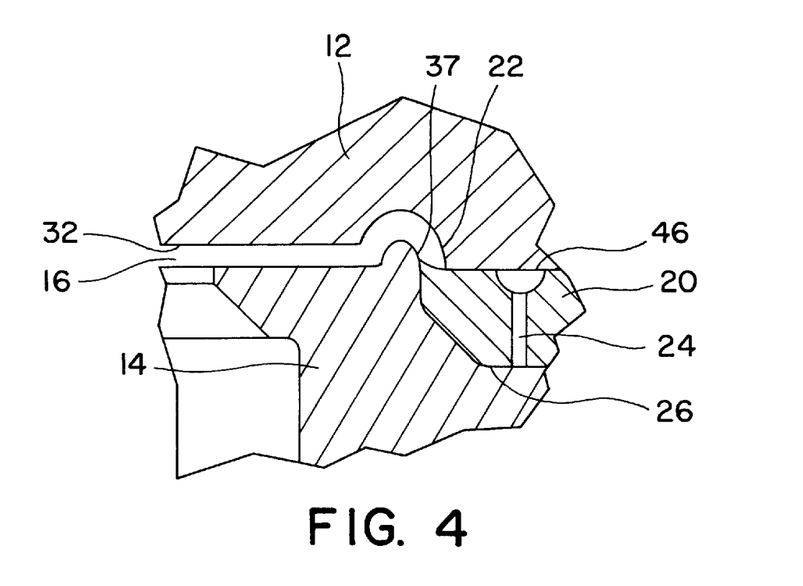
FIG. 4 is a sectional view of a detail of an empty assembled molding apparatus showing the cavity block, slip frame and core block.
Figure 5:
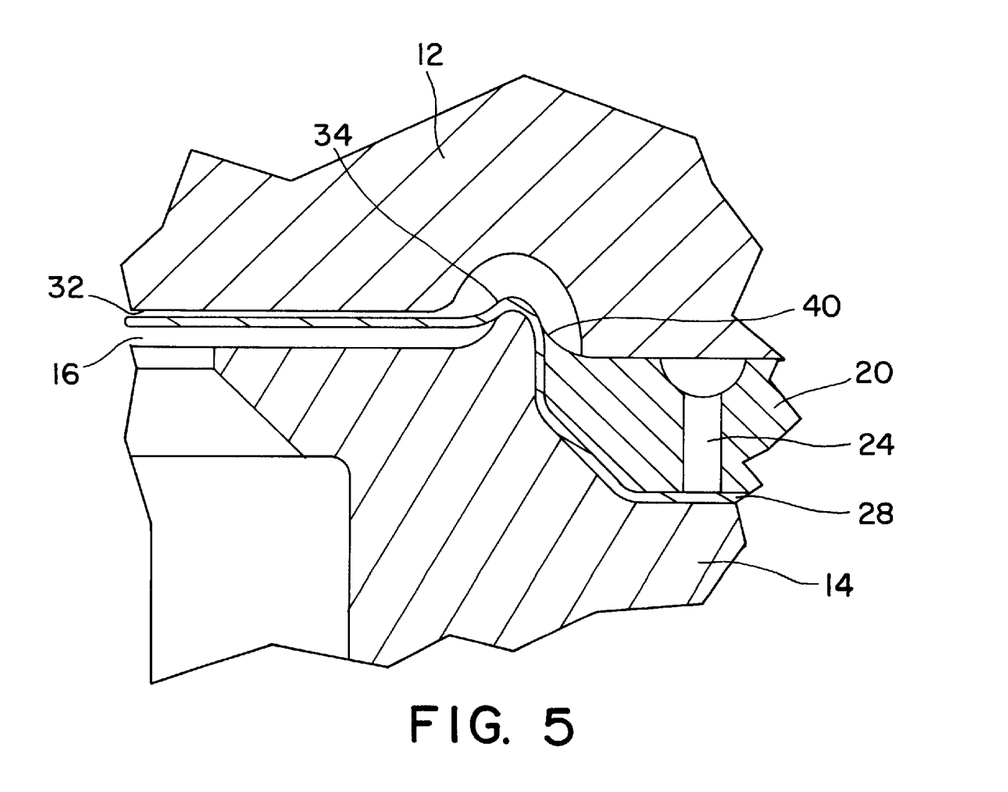
FIG. 5 is similar to FIG. 4 a piece of film being contained in the mold cavity.

In practice, the molding apparatus is partially assembled with slip frame 20 in place as shown in FIG. 2, apertures 27 of the slip frame and guides 29 serving to locate the frame. An overdimensioned sheet of stock film 28 is located in the mold cavity to be held in place by suction through vacuum holes 24. Core block 14 is then positioned as in FIGS. 1 and 5 by sliding along guides 29.

Figure 6:
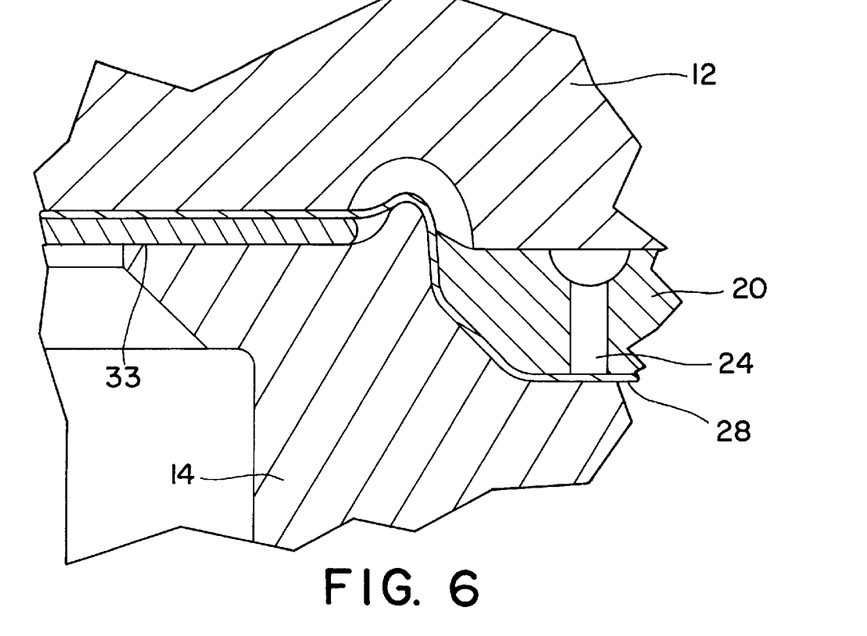
FIGS. 6 to 8 are each similar to FIG. 4 and sequentially show flow of molten plastic to fill the mold cavity.
Figure 7:
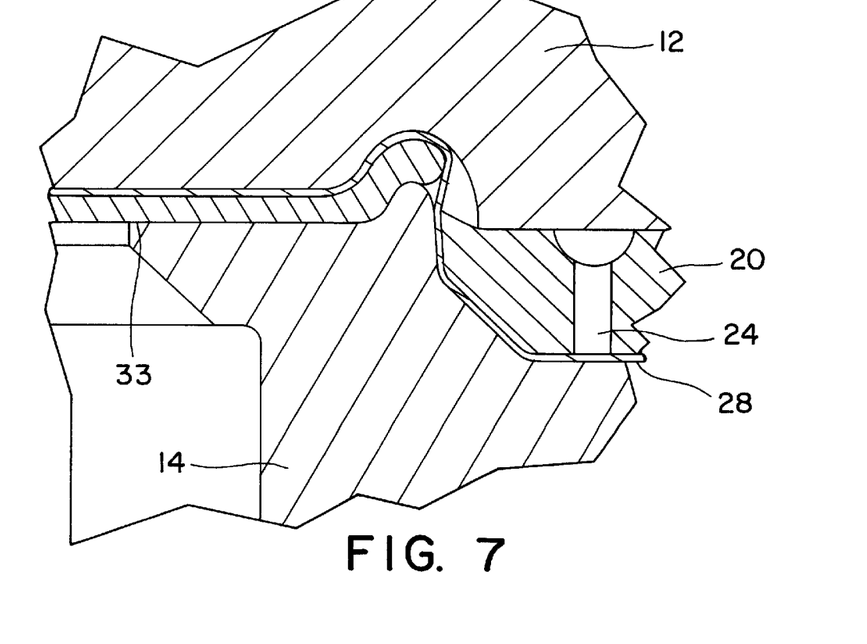

Molten material is injected in a conventional fashion through injection apparatus 30 the outlet of which is located about midway between the axial ends of cavity 16. The molten material presses against film 28 and forces the film against opposing cavity wall 32. As shown in the sequence of FIGS. 6 to 8, the cavity is gradually filled by molten material 33 of the substrate and external side, or outwardly directed face 34 of the film takes on the complementary relief, or three-dimensional impression of wall 32.

Figure 8:
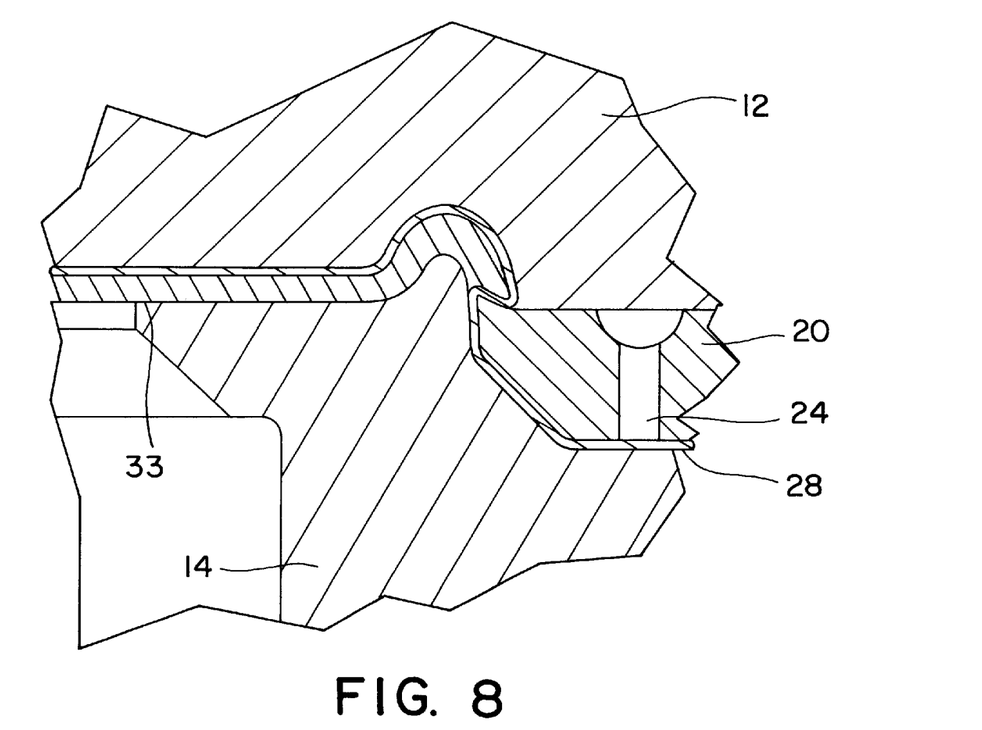

The arrangement is such that as the molten material fills the mold cavity, the film moves into place as shown in FIG. 8 with little stretching. In one embodiment of the invention this is achieved by reduction of the vacuum pressure holding the film edges in place as the molten material progresses to fill the cavity. It may be found most preferred to progressively reduce or release the vacuum pressure holding the film in place as the molten material progresses from the center toward the ends of the cavity. In another embodiment, the vacuum is held constant but at a suitable pressure so as to permit the required movement of the film edges. This may or may not be the same as the initial pressure required to secure the film in place initially prior to closing of the mold. In any case, appropriate movement of the film edges is to be permitted to avoid undue stretching of the film.

It will be appreciated that the film is oversized with respect to the cavity mold. Its edges thus extend into gap 26 to be held in place by negative vacuum pressure exerted through apertures 24. It is thought that the gap should extend laterally beyond the mold cavity an amount sufficient to permit use of a film dimensioned to remain in contact with holes 24 even after complete formation of the part. This may or may not ultimately be found to be necessary to the working of the invention.

What should be achievable with the disclosed approach is manufacture of an injection-molded piece having a decorative and/or protective film coat completely covering the obverse face of an underlying organic polymer substrate portion. The disclosed approach involves reduced stretching of the film such as is typically obtained when edges of a film are secured tightly in place during the injection molding operation. This is expected to lead to an improved product, possibly with respect to a reduced amount of "thinning" of the film in stretched areas and/or to improved wrapping characteristics of the film in corner regions of the final piece. In any case, it should be possible to manufacture an exterior component having a class A surface finish.

In the arrangement disclosed, edge wrap is provided for by perimeter surface 22. As most readily seen in FIG. 8, perimetral portion 36 of the film is formed onto the reverse side of the trim part substrate. This arrangement is achieved by having opening 37 of gap 26 lead into the cavity at location laterally inward of the edge of the cavity.

In the disclosed embodiment, circumferential ledge 22 of the slip frame has tip 40 around which the film is ultimately wrapped. This tip serves to thin the film to aid trimming of the piece. Using the illustrated arrangement, it might well be possible once the injection-molded part with film coat is formed and appropriately cooled, as required under the circumstance, that core block 14 can be moved away from the slip frame as seen in FIG. 2 and waste film 42 removed from part 18. Depending upon the conditions of the operation, i.e., the particular materials, temperatures, pressures etc. used, it may be found that the waste portion is actually cut from the part during the molding operation itself. Alternatively, a thinned region in the area of tip 40 may be obtained to aid removal of waste portion 42.

Once waste film 42 is removed, slip frame 20 is dislodged and the part removed from the mold cavity.

Although a vacuum is illustrated in the disclosed embodiment as means for securing the film in place within the mold cavity, it will be appreciated that mechanical means might also suffice. For example, a spring-loaded pressure device could well be suitable.

Suitable films for use in the context of the present invention are typically commercially available in rolled form in thicknesses anywhere from about 0.005 inches to 0.04 inches, although thinner or thicker films may also be found to be suitable. Either single ply or multi-ply films can be used. Particularly suitable, might be a multi-layer film having a tie-layer, i.e., reverse or back surface which readily bonds to the material from which the substrate is formed and having an outer layer which provides the desired aesthetic and/or protective effect.

A thermoplastic material such as polyvinyl chloride (PVC) can thus be used as substrate material with a film having a PVC tie-layer. Molten PVC substrate material thus bonds to the PVC tie-layer of the film during the injection molding process. There are many possible combinations. Substrate materials include thermoplastic olefins (TPO), thermoplastic polyurethane (TPU), acrylonitrile butadiene styrene (ABS), styrene acrylonitrile (SAN), and polycarbonate (PC) and can include recycled materials in situations in which the film completely covers the substrate from exposure during use, as for example, when the article is to be a trim piece installed on an automobile. This is not to say that it will never be preferred in certain situations to use a film having its backside coated with an adhesive to ensure proper adherence to the underlying substrate. In the context of this invention, a sufficiently secure bond is obtained in the manufactured article through injection-molding without the use of adhesive between a "compatible" film and substrate material.

Generally speaking the film coating must extend to at least cover the show surface of an article. Edge wrap is desirable in a final product to lessen the chance of delamination as previously mention. Edge wrap also decreases the likelihood of molten material seeping onto the front or exposed face of the film during formation of the product.

Suitable films are generally commercially available from various companies, such as Avery-Dennison, Rexham, Geon, etc. Films having tie-layers of PVC, TPO, TPU, ABS, PC, etc. are readily available. Materials suitable for the exposed layer of a film include paint film, thermoplastic fluoropolymers, etc.

A molding apparatus used in the context of this invention may be obtained by suitable modification of an existing apparatus. The molding steps of the process itself are largely conventional. Molten material is thus injected at conventional temperatures; cooling of the formed part is provided by coolant passing through cavity block hollows 44, etc. Vacuum is applied to the cavity during injection of the molten material through interface 46 between the slip frame and cavity block.

As far as the film sheet itself is concerned, it is thought possible that with selection of a film having an appropriate tie-layer and of appropriate thickness, no special treatment of the film is necessary. It might be found advantageous, in the case of a relatively thick film, for example, to pre-heat the film prior to injection of the molten material. Heating of a film increases its pliability and as such can improve its ability to be molded to shape during the injection molding process.

Apertures 24 of the disclosed molding apparatus have a diameter of about 0.125 inches and are spaced about 4 inches from each other. A vacuum capable of applying a vacuum pressure down to about 26 inches Hg would be suitable for use in the context of this invention.

A typical trim part manufacturable by means of the process and apparatus of this invention would, for example, be an automotive body side molding of length from anywhere from a few inches up to three or four feet, say, although the invention could be applied to obtain parts of a great variety of sizes and shapes. The illustrated part would further require means for attachment to an automobile, any conventional means for the configuration shown being suitable.

Gap 26 is of sufficient thickness to permit location of the perimeter of a film therein and slippage of the film as the part is being formed during injection molding of molten material. To accommodate films of various thickness a gap wider than is necessary for the thinnest of films may be used, or it may be preferred to suitably locate spacers between the slip frame and core block in order to accommodate films of various gauges.

What is claimed is:

1. A process for manufacturing an article having an outer film secured to a front face of an underlying injection-molded substrate having a rear portion and to a continuous perimetral rear portion of the substrate, comprising the steps of:

moving a frame into position with respect to a cavity wall of a cavity block of a molding apparatus, the wall being shaped to define a front face of the article, to locate a portion of the frame in a position facing the cavity wall to shape the rear portion of the article;

locating an oversized piece of film in the apparatus for injection of molten material against a rear face thereof;

closing the molding apparatus by moving a core block in a first direction into position such that a mold cavity is defined between walls of the cavity block, the core block and the frame, a periphery of the piece of film being located between abutting surfaces of the core block and the frame;

releasably securing the periphery of the piece of film in the apparatus by applying vacuum pressure to the piece of film through apertures in a wall surrounding the cavity wall;

injecting molten material, to form the article in the mold cavity, and forcing the piece of film into abutment with the cavity wall of the cavity block and the portion of the frame facing the cavity wall of the cavity block including wrapping a perimeter of the piece of film onto the continuous perimetral rear portion of the substrate, wherein said step of releasably securing the periphery of the piece of film permits movement of the piece of film into said abutment with the cavity wall of the cavity block and the portion of the frame facing the cavity wall of the cavity block to preclude undue stretching of the film as the molten material fills the mold cavity; and moving the core block and the frame out of said position in a second direction opposite to the first direction, to permit removal of the article from the cavity block, wherein the mold cavity is longitudinally shaped for manufacturing a longitudinal automotive trim piece having a longitudinal axis, during the injection step the molten material is injected at a longitudinally intermediate location of the mold cavity, and the step of releasably securing the piece of film further includes releasing the vacuum pressure from the longitudinally intermediate location of the mold cavity to first and second axial ends of the mold cavity as the molten material moves from the longitudinally intermediate location of the mold cavity toward the first and second axial ends of the mold cavity to thereby form said article.

2. A process for manufacturing an article having an outer film secured to a front face of an underlying injection-molded substrate and to a continuous perimetral rear portion of the substrate, comprising the steps of:

moving a frame into position with respect to a cavity wall of a cavity block of a molding apparatus, the wall being shaped to define a front face of the article, to locate a portion of the frame in a position facing the cavity wall to shape a rear portion of the article;

locating an oversized piece of film in the apparatus for injection of molten material against a rear face thereof;

closing the molding apparatus by moving a core block in a first direction into position such that a mold cavity is defined between walls of the cavity block, the core block and the frame, a periphery of the piece of film being located between abutting surfaces of the core block and the frame;

releasably securing the periphery of the piece of film in the apparatus by applying vacuum pressure to the piece of film through apertures in a wall surrounding the cavity wall;

injecting molten material, to form the article in the mold cavity, by forcing the piece of film into abutment with the cavity wall of the cavity block and the portion of the frame facing the cavity wall of the cavity block including wrapping a perimeter of the piece of film onto the continuous perimetral rear portion of the substrate, wherein said step of releasably securing the periphery of the piece of film permits movement of the piece of film into said abutment with the cavity wall of the cavity block and the portion of the frame facing the cavity wall of the cavity block to preclude undue stretching of the film as the molten material fills the mold cavity; and moving the core block and the frame out of said position in a second direction opposite to the first direction, to permit removal of the article from the cavity block, wherein the step of releasably securing the piece of film further includes releasing the vacuum pressure during the step of injecting molten material as the molten material is injected into the mold cavity to thereby form said article.

3. The process of claim 2 wherein the molten material and a reverse face of said piece of film are compatible.

4. The process of claim 3 wherein the piece of film includes a tie-layer selected from the group consisting of thermoplastic olefins, thermoplastic polyurethane, acrylonitrile butadiene styrene, styrene acrylonitrile, and polycarbonate and the molten material is compatible with the tie-layer.

5. The process of claim 3 wherein the molten material is selected from the group consisting of thermoplastic olefins, thermoplastic polyurethane, acrylonitrile butadiene styrene, styrene acrylonitrile, and polycarbonate and the piece of film includes a reverse layer compatible with the molten material.

6. The process of claim 2 wherein the frame further includes a pointed tip surrounding the mold cavity and located to coincide with an edge of the piece of film on the continuous perimetral rear portion of said article, and the step of injecting molten material further includes thinning an area of the piece of film by the pointed tip, and further comprising the step of removing excess film from the article along the thinned area of the piece of film.

7. The process of claim 2 wherein at least a part of the portion of the frame which shapes the rear portion of the article is angled toward the cavity wall.

8. The process of claim 2 wherein the apertures are defined by the frame.

* * * * *